(12) United States Patent
Zhang et al.

(10) Patent No.: US 11,575,497 B2
(45) Date of Patent: Feb. 7, 2023

(54) REDUCED POWER AND AREA EFFICIENT RECEIVER CIRCUITRY

(71) Applicant: XILINX, INC., San Jose, CA (US)

(72) Inventors: Wenfeng Zhang, San Jose, CA (US); Zhaoyin Daniel Wu, Los Gatos, CA (US); Parag Upadhyaya, Los Gatos, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 17/351,028

(22) Filed: Jun. 17, 2021

(65) Prior Publication Data

US 2022/0407676 A1 Dec. 22, 2022

(51) Int. Cl.
*H04L 7/00* (2006.01)
*H04B 1/16* (2006.01)

(52) U.S. Cl.
CPC ............ *H04L 7/0054* (2013.01); *H04B 1/16* (2013.01)

(58) Field of Classification Search
CPC ..................................................... H04L 7/0054
USPC ......................................................... 375/354
See application file for complete search history.

(56) References Cited

U.S. PATENT DOCUMENTS

| 8,401,064 B1* | 3/2013 | Lin ................... H04L 25/03267 375/326 |
| 9,106,462 B1* | 8/2015 | Aziz ................. H04L 25/03057 |
| 9,397,824 B1* | 7/2016 | Hoshyar ................. H04L 27/01 |
| 2014/0270030 A1* | 9/2014 | Hammad .............. H04L 7/0016 375/371 |

OTHER PUBLICATIONS

Zhou, Yushi, et al., Adaptive 4PAM Decision Feedback Equalizer with Reduce Number of Slices, 2017 IEEE 60th International Midwest Symposium on Circuits and Systems (MWSCAS), IEEE, Aug. 6, 2017 (4 pages).
Im, Jay, et al., "A 40-to-56 GB/s PAM-4 Receiver with Ten-Tap Direction Decision-Feedback Equalization in 16-nm FinFET", IEEE Journal of Solid-State Circuits, vol. 52, No. 12, Dec. 2017 (17 pages).
Poon, Chi Fung, et al., "A 1.24pJ/b 112Gb/s (870 Gbps/mm) Transreceiver for In-package Links in 7nm FinFET", 2021 Symposium on VLSI Circuits, JSAP, Jun. 13, 2021 (2 pages).

* cited by examiner

*Primary Examiner* — Lihong Yu
(74) *Attorney, Agent, or Firm* — Patterson + Sheridan, LLP (57) ABSTRACT

In one example, receiver circuitry for a communication system comprises signal processing circuitry configured to receive a data signal and generate a processed data signal, and error slicer circuitry. The error slicer circuitry is coupled to the output of the signal processing circuitry, and configured to receive the processed data signal. The error slicer circuitry comprises a first error slicer configured to receive a clock signal, and output a first error signal based on a first state of the clock signal and processed data signal. The first error slicer is further configured to output a second error signal based on a second state of the clock signal and the processed data signal.

20 Claims, 6 Drawing Sheets

REDUCED POWER AND AREA EFFICIENT RECEIVER CIRCUITRY

TECHNICAL FIELD

Examples of the present disclosure generally relate to electronic circuits and, in particular, to error slicer circuitry of receiver circuitry.

BACKGROUND

Receiver circuitry of a pulse amplitude modulation 4-level (PAM4) receiver uses three data slicers per clock phase to detect the four data levels (e.g., 00, 01, 10, and 11). Each of the data slicers corresponds to a respective one of a DH (a high data latch voltage) threshold, DZ (a middle data latch voltage) threshold, and DL (a low data latch voltage) threshold. Accordingly, for four clock phases, the receiver circuitry includes twelve data slicers. Further, for offset cancellation and data threshold level adaptions within the receiver circuitry, the receiver circuitry includes one error slicer per clock phase. For each clock phase, a first error slicer detects a voltage level EHP (a positive error latch voltage with a high voltage magnitude), a second error slicer detects a voltage level ELP (a positive error latch voltage with a low voltage magnitude), a third error slicer detects a voltage level EHN (a negative error latch voltage with a high voltage magnitude), and a fourth error slicer detects a voltage level ELN (a negative error latch voltage with a low voltage magnitude). Accordingly, for four clock phases, the receiver circuitry includes four error slicers. In total, a receiver circuitry that uses four clock phases has 16 total slicers (e.g., 12 data slicers and 4 error slicers). The large number of error and data slicers increases the overall circuit size of the receiver circuitry and power used by the receiver circuitry. Further, the large number of error and data slicers increases the loading to signal processing circuitry of the receiver circuitry, limiting the bandwidth of the signal processing circuitry.

SUMMARY

Receiver circuitry includes both error slicer circuitry and data slicer circuitry. The data slicer circuitry detects the different data levels of a transmitted data signal. For example, in a pulse amplitude modulation 4-level (PAM4) receiver, three data slicers are used per clock phase to detect respective ones of one of a DH threshold (a high voltage threshold), DZ threshold (a mid-voltage threshold), and DL threshold (a low voltage threshold). Error slicer circuitry detects voltage levels associated with different voltage references for each clock phase. The detected voltage levels may be used for offset cancellation and data threshold level adaptions within the receiver circuitry. In one example, to reduce the size of the circuit area of the receiver circuitry and the power used by the receiver circuitry, the error slicers of the error slicer circuitry are used in a time-multiplexed fashion. For example, each error slicer of the error slicer circuitry detects two different voltage references. Each error slicer of the error slicer circuitry may detect a positive voltage reference during a first period and a negative voltage reference during a second period. Time multiplexing the error slicers reduces the circuit area of the receiver circuitry and power used by the receiver circuitry.

In one example, receiver circuitry for a communication system comprises signal processing circuitry configured to receive a data signal and generate a processed data signal, and error slicer circuitry. The error slicer circuitry is coupled to the output of the signal processing circuitry, and configured to receive the processed data signal. The error slicer circuitry comprises a first error slicer configured to receive a clock signal, and output a first error signal based on a first state of the clock signal and the processed data signal. The first error slicer is further configured to output a second error signal based on a second state of the clock signal and the processed data signal.

In one example, a communication system comprises transmitter circuitry configured to transmit a data signal, and receiver circuitry connected to the transmitter circuitry via a channel. The receiver circuitry comprises signal processing circuitry configured to receive the data signal and generate a processed data signal, and error slicer circuitry coupled to the output of the signal processing circuitry. The error slicer circuitry comprises a first error slicer. The first error slicer is configured to receive a clock signal, and output a first error signal based on a first state of the clock signal and the processed data signal. The first error slicer is further configured to output a second error based on a second state of the clock signal and the processed data signal.

In one example, a method for operating receiver circuitry comprises receiving a data signal and processing the data signal to generate a processed data signal. The method further comprises receiving, at a first error slicer of error slicer circuitry, a clock signal, and outputting, from the first error slicer, a first error signal based on a first state of the clock signal and the processed data signal. Further, the method comprises outputting, from the first error slicer, a second error signal based on a second state of the clock signal and the processed data signal.

These and other aspects may be understood with reference to the following detailed description.

BRIEF DESCRIPTION OF THE DRAWINGS

So that the manner in which the above-recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Receiver circuitry includes error slicer circuitry and data slicer circuitry. In one example, the error slicer circuitry and data slicer circuitry may be part of a front end of the receiver circuitry. Further, the receiver circuitry may be configured to receive the data signals of a pulse amplitude modulation 4-level (PAM4) communication system. The data slicer circuitry detects the different data levels of a transmitted data signal. In a PAM4 communication system, to detect the four data levels (00, 01, 10, and 11) the data slicer circuitry includes three data slicers per phase of the clock signal. A first data slicer is used to detect a first voltage threshold (e.g., a DH threshold) per phase of the clock signal, a second data slicer is used to detect a second voltage threshold (e.g., a DZ threshold) per phase of the clock signal, and third data slicer is used to detect a third voltage threshold (e.g., a DL threshold) per phase of the clock signal. The DH threshold has a voltage level higher than that of the DZ threshold, and the DZ threshold has a voltage level higher than that of the DL threshold. Further, the receiver circuitry includes error slicer circuitry that detect voltage levels associated with different voltage references for each clock phase. The detected voltage levels are used for offset cancellation and data threshold level adaptions within the receiver circuitry.

The error slicers of the error slicer circuitry are used in a time-multiplexed fashion to reduce the size of the circuit area of the receiver circuitry, and to reduce the power used by the receiver circuitry. For example, each error slicer within the error slicer circuitry detects two different error voltage values (e.g., voltage references). The two different error voltage values include a positive error voltage value detected during a first period and a negative error voltage value detected during a second period. In one example, the error voltage values include a high positive error voltage level (error voltage value EHP), a low positive error voltage level (error voltage value ELP), a high negative error voltage level (error voltage value EHN) and a low negative error voltage level (error voltage value ELN). A first error slicer of the error slicers detect error voltage values EHP and EHN in an alternating fashion based on a time-multiplexed scheme, and a second error slicer of the error slicers detect error voltage values ELP and ELN in an alternating fashion based on a time-multiplexed scheme. Time multiplexing the error slicers reduces the circuit area of the receiver circuitry and power used by the receiver circuitry.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

Figure 1:
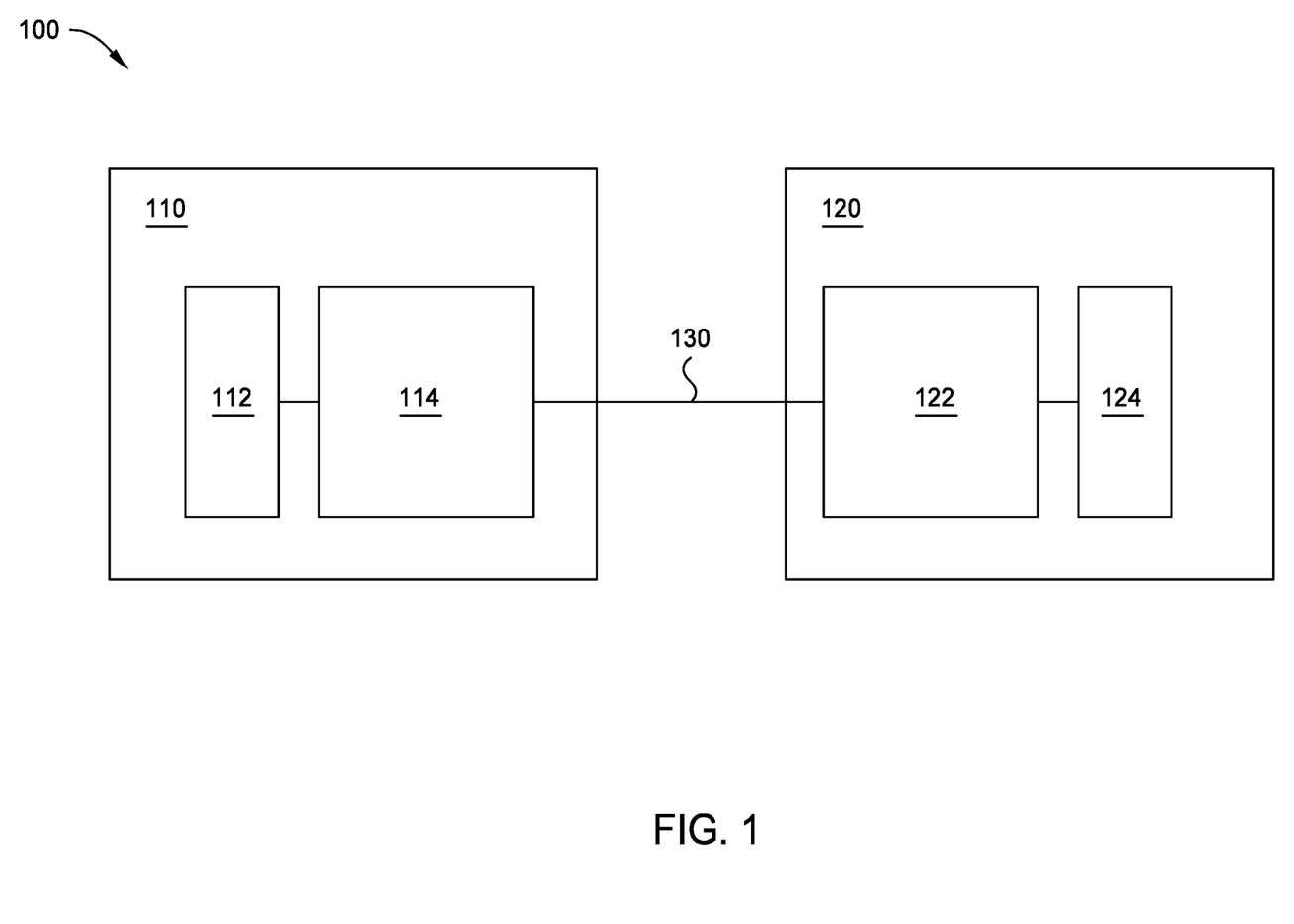
FIG. 1 is a block diagram depicting an example communication system, according to an example.

FIG. 1 illustrates a block diagram of a communication system 100, according to one or more examples. The communication system 100 includes a serializer/derserializer (SerDes) 110 and a SerDes 120. The SerDes 110 is communicatively coupled to the SerDes 120 via a channel 130. The channel 130 may include one or more traces (routings). For example, the channel 130 may include two traces and may be a differential communication channel. The SerDes 110 and the SerDes 120 may be part of one or more integrated circuits (ICs), such as one or more application specific ICs (ASICs) or one or more programmable ICs (e.g., a field programmable gate array (FPGA).

The SerDes 110 includes parallel-in-serial-out (PISO) circuitry 112 and transmitter circuitry 114. In various examples, the SerDes 110 includes additional circuit elements. For example, the SerDes 110 may include receiver circuitry and corresponding circuit elements. Further, the SerDes 110 may include signal processing circuitry (e.g., encoder circuitry or decoder circuitry, among others). The PISO circuitry 112 converts parallel input data to serial output data for transmission by the transmitter circuitry 114 over the channel 130.

The SerDes 120 includes receiver circuitry 122 and serial-in-parallel-out (SIPO) circuitry 124. The SerDes 120 may include additional circuit elements not illustrated in FIG. 1. For example, the SerDes 120 may include transmitter circuitry and/or signal processing circuitry (e.g., encoder circuitry or decoder circuitry, among others). The receiver circuitry 122 receives a signal from the transmitter circuitry 114 via the channel 130. Further, the receiver circuitry 122 processes the received signal and outputs an output signal to the SIPO circuitry 124. The output signal is a serial data signal. The SIPO circuitry 124 converts the serial data signal received from the receiver circuitry 122 to parallel output data.

In one example, the communication system 100 is an extra short reach (XSR) communication system or an ultra-short reach (USR) communication system. In one example, the length of the channel 130 is less than about 15 mm. In some examples, the length of the channel 130 is greater than about 15 mm.

While the communication system 100 is illustrated as including the SerDes 110 and the SerDes 120, in other examples, the transmitter circuitry 114 and/or the receiver circuitry 122 may be stand-alone circuit elements. Further, the transmitter circuitry 114 and the receiver circuitry 122 may be part of one or more ICs, such as one or more ASICS or one or programmable ICs.

Figure 2:
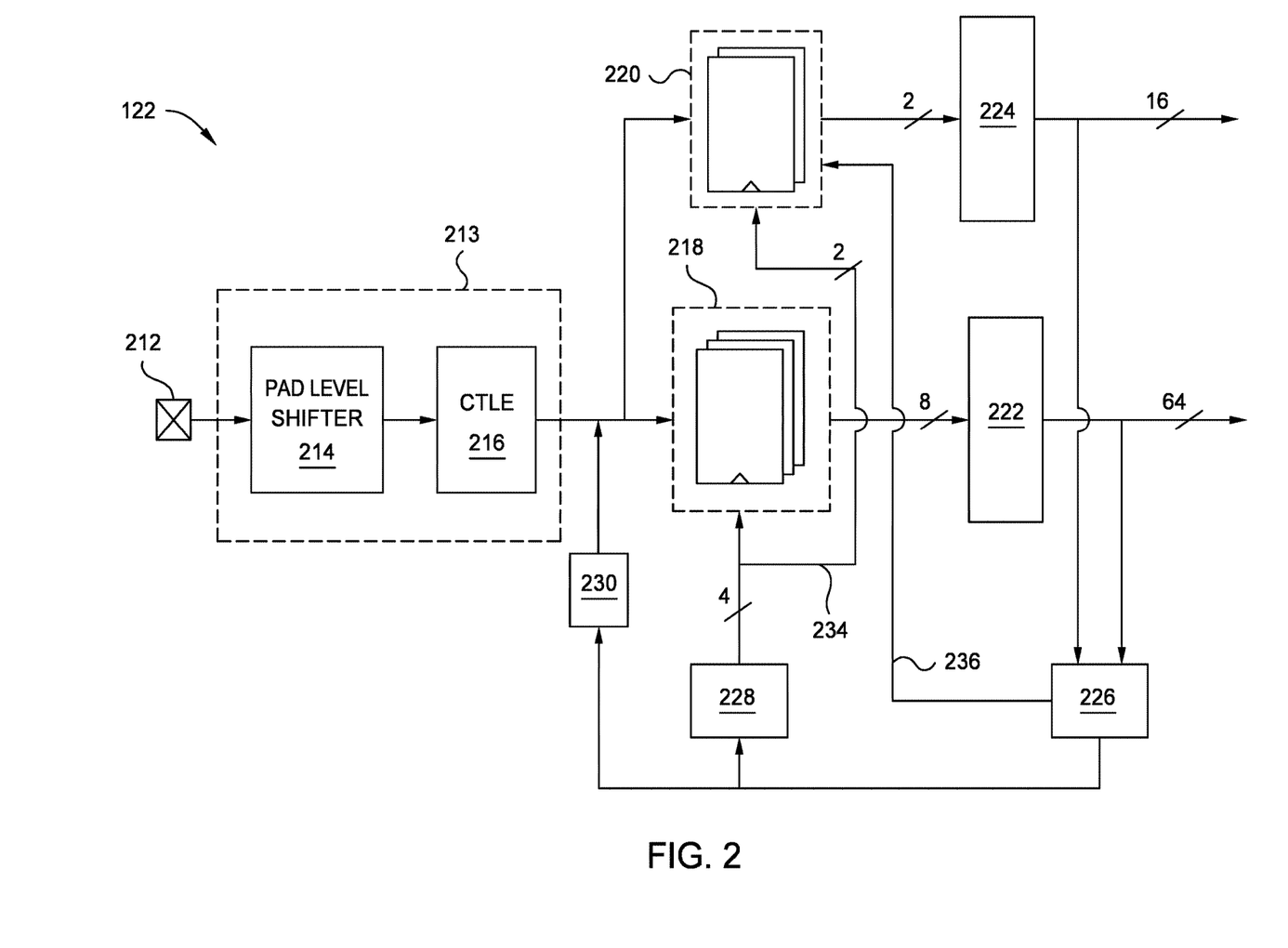
FIG. 2 is a block diagram depicting example receiver circuitry, according to an example.

FIG. 2 illustrates a schematic block diagram of the receiver circuitry 122, according to one or more examples. The receiver circuitry 122 is a multi-level receiver. For example, the receiver circuitry 122 may be a pulse amplitude modulation 4-level (PAM4) receiver and receives and processes a data signal having four levels. In other examples, the receiver circuitry 122 receives and processes a data signal less than or more than four levels. In the example of FIG. 2, the receiver circuitry 122 includes input pad 212, level shifter circuitry 214, continuous time linear equalizer (CTLE) circuitry 216, data slicer circuitry 218, error slicer circuitry 220, deserializer circuitry 222, 224, clock and data-recovery (CDR) adaption circuitry 226, clock generator circuitry 228, and offset cancellation circuitry 230.

A signal transmitted from transmitter circuitry (e.g., the transmitter circuitry 114) is received at the input pad 212. The level shifter circuitry 214 is connected to the input pad 212 and adjusts the voltage level of the received signal to be within the operating parameters of the CTLE circuitry 216. The CTLE circuitry 216 is connected to the level shifter circuitry 214. The CTLE circuitry 216 operates as a high-pass filter or a band-pass filter to compensate for the low-pass characteristics of the channel 130. The level shifter circuitry 214 and the CTLE circuitry 216 form at least part of the signal processing circuitry 213.

Figure 3:
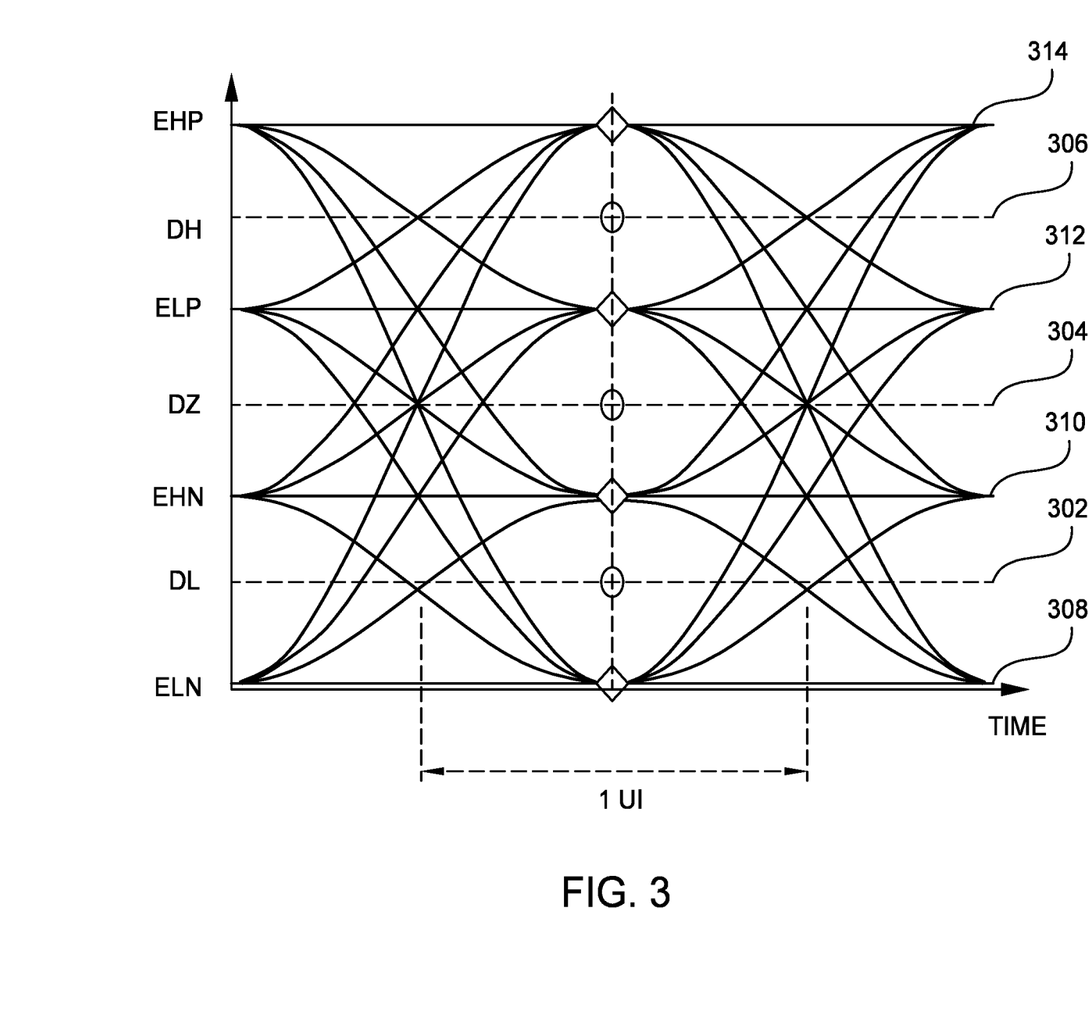
FIG. 3 is an example eye diagram for receiver circuitry, according to an example.

The CTLE circuitry 216 outputs an equalized analog signal to the data slicer circuitry 218 and the error slicer circuitry 220. The data slicer circuitry 218 detects one or more data levels within the equalized analog signal associated with the threshold references DH, DZ, and DL. With reference to FIG. 3, the threshold reference DH corresponds to a data threshold voltage DH 306, the threshold reference DZ corresponds to a data threshold voltage DZ 304, and the threshold reference DL corresponds to a data threshold voltage DL 302. The voltage level of data threshold voltage DL 302 is less than the voltage level of data threshold voltage DZ 304, and the voltage level of data threshold voltage DZ 304 is less than the voltage level of data threshold voltage DH 306.

FIG. 3 illustrates an exemplary eye diagram for a PAM-4 signaling scheme. In a four level signaling scheme, such as PAM-4, the voltage (e.g., transmitted data signal) on a signal conductor (e.g., the channel 130) takes one of four values of increasing voltage. For example, the voltage may take a first value, error voltage value ELN 308, a second value, the error voltage value EHN 310, a third value, the error voltage value ELP 312, or a fourth value, the error voltage value EHP 314. As illustrated in FIG. 3, the error voltage value ELN 308 is less than the error voltage value EHN 310, the error voltage value EHN 310 is less than the error voltage value ELP 312, and the error voltage value ELP 312 is less than the error voltage value EHP 314. In one example, the magnitude of the error voltage value EHP 314 and the error voltage value EHN 310 are similar (e.g., within manufacturing tolerances, circuit related tolerances, and/or signal processing tolerances with each other, or within about 5—about 10 percent with each other), and the magnitude of the error voltage value ELP 312 and the error voltage value ELN 308 are similar (e.g., within manufacturing tolerances, circuit related tolerances, and/or signal processing tolerances with each other, or within about 5 to about 10 percent with each other). Further, in one example, the error voltage value EHP 314 and the error voltage value ELP 312 are positive voltages and the error voltage value EHN 310 and the error voltage value ELN 308 are negative voltages.

The data threshold voltage DL 302 is between the error voltage value ELN 308 and the error voltage value EHN 310. The data threshold voltage DZ 304 is between the error voltage value EHN 310 and the error voltage value ELP 312. The data threshold voltage DH 306 is between the error voltage value ELP 312 and the error voltage value EHP 314

With further reference to FIG. 2, the data slicer circuitry 218 includes three data slicers per phase of a clock signal (e.g., the clock signal 234). The data slicer circuitry 218 receives the clock signal 234 from the clock generator circuitry 228. For each phase of the clock signal 234, a first data slicer is associated with threshold reference DH and outputs data signal DH by sampling the equalized analog signal, a second data slicer is associated with threshold reference DZ and outputs a data signal DZ by sampling the equalized analog signal, and a third data slicer circuit is associated with threshold reference DL and outputs a data signal DL by sampling the equalized analog signal. Each of the data signals DH, DZ, and DL may correspond to one or more data bits.

Each of the data slicers receives a corresponding phase of the clock signal 234. For example, a first phase of the clock signal 234 is provided to a first three of the data slicers, a second phase of the clock signal 234 is provided to a second three of the data slicers, a third phase of the clock signal 234 is provided to a third three of the data slicers, and a fourth phase of the clock signal 234 is provided to a fourth phase of the data slicers. In one example, the first phase is 0 degrees, the second phase is 90 degrees, the third phase is 180 degrees, and the fourth phase is 270 degrees.

The data signals generated by the data slicer circuitry 218 are output to the deserializer circuitry 222. The deserializer circuitry 222 converts the serial data signals to parallel signals and provides the parallel signal to other circuit elements within the communication system (e.g., the communication system 100).

The error slicer circuitry 220 receives the equalized analog signal from the CTLE circuitry 216. The error slicer circuitry 220 generates one or more error outputs by sampling the equalized analog signal. For example, the error slicer circuitry 220 generates the error voltage values EHP, ELP, EHN, and ELN by sampling the equalized analog signal and outputs a corresponding error signal EHP, ELP, EHN, and ELN.

The error slicer circuitry 220 includes a first error slicer for a first two of the error voltage value (e.g., error voltage values EHP and EHN), and a second error slier for a second two of the error voltage value (e.g., error voltage values ELP and ELN). Each of the error slicers includes multiplexer circuitry. For example, with reference to FIG. 4, each of the error slicers 420 include a corresponding multiplexing circuitry 422. The use of the multiplexer circuitry 422 within the error slicers 420 allows for the error slicers 420 to be used in a time-multiplexed (e.g., time-shared) scheme. In one example, as compared to error slicer circuitry that includes error slicer circuits that do not include multiplexers, the error slicer circuitry 220 includes a reduced number of error slicers. For example, the error slicer circuitry 220 includes two error slicers 420, however, in implementations that do not use a time multiplexing scheme, the error slicer circuitry includes four error slicers. Accordingly, an error slicer circuitry 220 that includes error slicers that use a time-multiplexed scheme uses less error slicers, reducing the power used by the receiver circuitry 122 and the circuit area of the receiver circuitry 122. Further, by using a reduced number of error slicer circuits, the loading on the CTLE circuitry 216 is reduced, further reducing the power used by the receiver circuitry 122 and the circuit area of receiver circuitry. Additionally, the circuit size of the deserializer circuitry 224 may be reduced. For example, as the number of error slicers providing data is reduced during any period (e.g., two error slicers during each period), the circuit size of the deserializer circuitry 224 may be reduced by about half as compared to instances where time-multiplexed error slicers are not used.

In one example, a first error slicer of the error slicer circuitry 220 detects the error voltage level of EHP and EHN and a second error slicer of the error slicer circuitry 220 detects ELP and ELN. In implementations that do not use a time-multiplexed scheme, a different error slicer is used to determine the error voltage level of EPH, the error voltage level of ELP, the error voltage level of EHN, and the error voltage level ELN.

Figure 4:
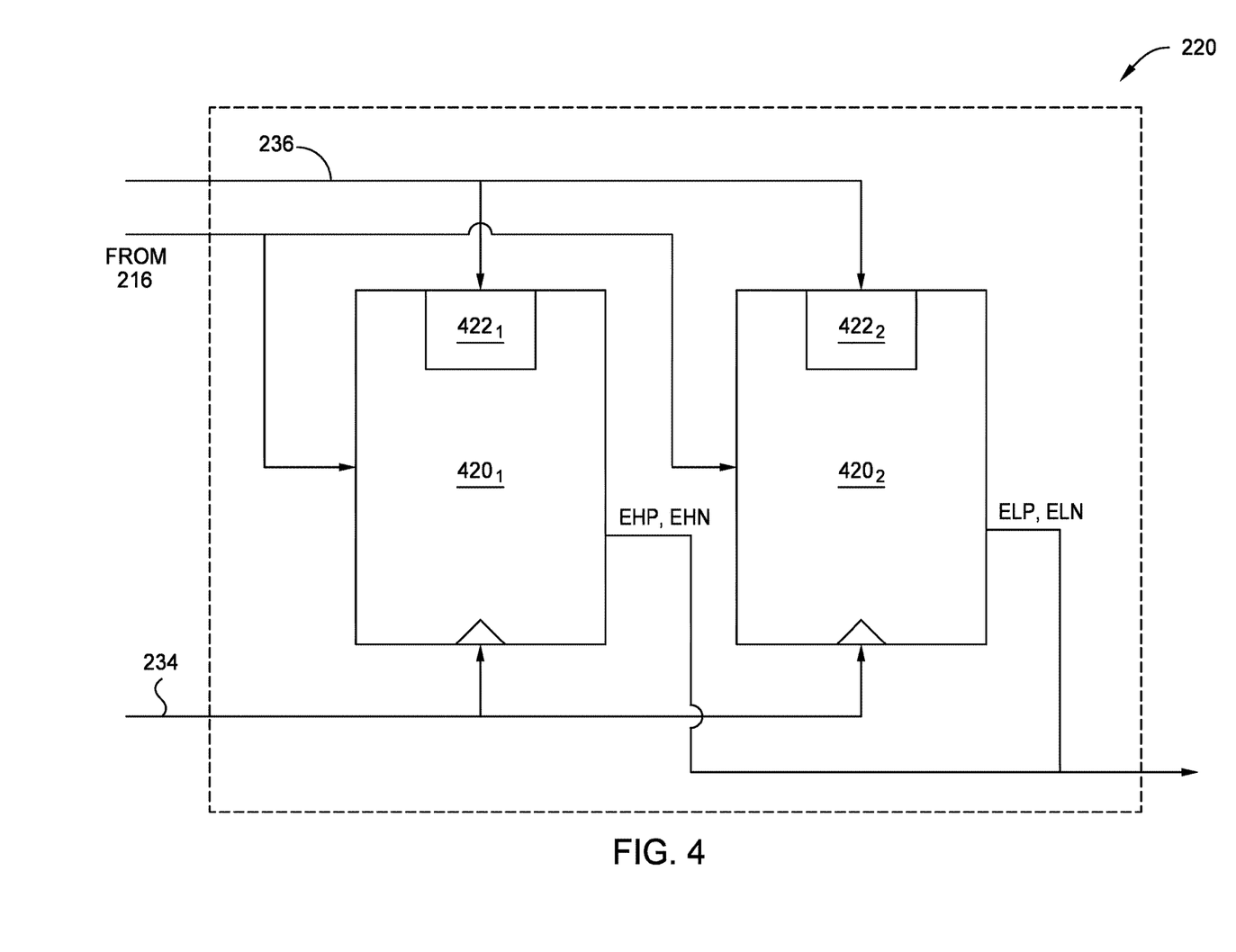
FIG. 4 is a block diagram of an example error slicer circuitry, according to an example.

The error slicer circuitry 220 receives clock signal 234 from the clock generator circuitry 228 and clock signals 236 from the CDR adaption circuitry 226. The clock signal 234 provides the clock signal to each error slicer of the error slicer circuitry 220. The clock signal 234 controls the operation of the error slicers 420 within the error slicer circuitry 220. The clock signal 236 control the multiplexer circuitry within each error slicer of the error slicer circuitry 220. In one example, based on the clock signal 236 having a first value, the error slicer circuitry 220 detect EHP and ELP and based on the clock signal 236 having a second value, the error slicer circuitry 220 detects EHN and ELN.

FIG. 4 illustrates the error slicer circuitry 220, according to one or more examples. The error slicer circuitry 220 includes error slicers $420_1$ and $420_2$. Each of the error slicers $420_1$ and $420_2$ includes respective multiplexer circuitry 422 (e.g., multiplexer circuitry $422_1$ and $422_2$).

The error slicers $420_1$ and $420_2$ receive the clock signal 234, the clock signal 236, and the equalized analog signal from the CTLE circuitry 216. The state of the clock signal 236 controls the state of the multiplexer circuitry 422 of each of the error slicers $420_1$ and $420_2$. For example, based on the clock signal 236 having a first state, the multiplexer circuitry 422 of the error slicers $420_1$ and $420_2$ is set to a first state (e.g., a positive state). In the first state, the error slicer $420_1$ detects the error voltage value EHP and the error slicer $420_2$ detects the error voltage value ELP. In one example, the error slicer $420_1$ detects the error voltage value EHP during a first period and the error slicer $420_2$ detects the error voltage value ELP during a second period that at least partially overlaps with the first period. In one example, the first and second periods completely overlap with each other such that the first and second periods have the same length, and start and end at the same time. Based on the clock signal 236 having a second state, the multiplexer circuitry 422 of the error slicers $420_1$ and $420_2$ is set to a second state (e.g., a negative state). In the second state, the error slicer $420_1$ detects the voltage value EHN and the error slicer $420_2$ detects the voltage value ELN. In one example the error slicer $420_1$ detects the voltage value EHN during a third period and the error slicer $420_2$ detects the voltage value ELN during a fourth period that at least partially overlaps with the third period. Further, the first and second periods are non-overlapping with the third and fourth periods. The third and fourth periods are occur after or before the first and third periods. In one example, the third and fourth periods completely overlap with each other such that the third and fourth periods have the same length, and start and end at the same time. Additionally, or alternatively, the first period, the second period, the third period and the fourth period at least partially overlap with a period during which the data slicers of the data slicer circuitry 218 processes the equalized analog signal from the CTLE circuitry 216, such that the error slicers $420_1$ and $420_2$ and the data slicers of the data slicer circuitry 218 process the equalized analog signal during at least partially overlapping periods to generate voltage values EHP, ELP, EHN, and ELN, and data threshold voltages DL, DZ, and DH.

The first state of the clock signal 236 corresponds to a high level of the clock signal 236 and the second state of the clock signal 236 corresponds to a low level of the clock signal 236.

In one example, during a first period associated with the first state of the clock signal 236, the error slicer $420_1$ outputs the error voltage value EHP by sampling the equalized analog signal to the deserializer circuitry 224, and the error slicer $420_2$ outputs the voltage value ELP by sampling the equalized analog signal to the deserializer circuitry 224.

During a second period associated with the second state of the clock signal 236, the error slicer $420_1$ outputs the error voltage signal EHN to the deserializer circuitry 224 by sampling the equalized analog signal, and the error slicer $420_2$ outputs the error voltage signal ELN to the deserializer circuitry 224 by sampling the equalized analog signal.

With further reference to FIG. 2, the error signals (e.g., error voltage values EHP, ELP, EHN, and ELN) generated by the error slicer circuitry 220 are output to the deserializer circuitry 224. The deserializer circuitry 224 converts the serial data signals to parallel signals. During the first state of the clock signal 236, the deserializer circuitry 224 receives positive error signals (e.g., error voltage values EHP and ELP) from the error slicer circuitry 220, and during the second state of the clock signal 236, the deserializer circuitry 224 receives negative error signals (e.g., error voltage values EHN and ELN) from the error slicer circuitry 220. As compared to error slicers that do not use a time multiplexing scheme, during each state of the clock signal 236, the deserializer circuitry 224 receives less error signals. Accordingly, the size of the deserializer circuitry 224 may be reduced, reducing the power used by the deserializer circuitry 224 and the circuit area of the deserializer circuitry 224.

The CDR adaption circuitry 226 receives the output signal of the deserializer circuitry 222 and the deserializer circuitry 224. The CDR adaption circuitry 226 generates a clock control signal from the output signal provided by the deserializer circuitry 222 and the deserializer circuitry 224. The clock control signal is output to the clock generator circuitry 228 to generate the clock signal 234. Further, the CDR adaption circuitry 226 generates the clock signal 236. The CDR adaption circuitry 226 changes the state of the clock signal 236 every X cycles of an internal clock signal of the CDR adaption circuitry 226. X is 64, 128, 256, 512, 1024, or more. The clock signal 236 has about a 50 percent duty cycle. In one example, the CDR adaption circuitry 226 generates the clock control signal based on generated timing error values determined from the output signals of the deserializer circuitry 222 and the deserializer circuitry 224. In one example, the CDR adaption circuitry 226 generates control signals to control the threshold voltages of the data slicers of the data slicer circuitry 218 and the error slicers 420. Further, the CDR adaption circuitry 226 may generate cursor-weights (h) for pre-cursor(s), main cursor, and post-cursor(s) for each symbol of the received signal.

The clock generator circuitry 228 generates the clock signal 234 at the different phases from the clock control signal generated by the CDR adaption circuitry 226. In one example, the clock generator circuitry 228 generates the clock signal 234 at a 0 degree phase, the clock signal 234 at a 90 degree phase, the clock signal 234 at a 180 degree phase, and the clock signal 234 at a 270 degree phase. The clock generator circuitry 228 outputs the clock signal 234 to the data slicer circuitry 218 and the error slicer circuitry 220.

Figure 5:
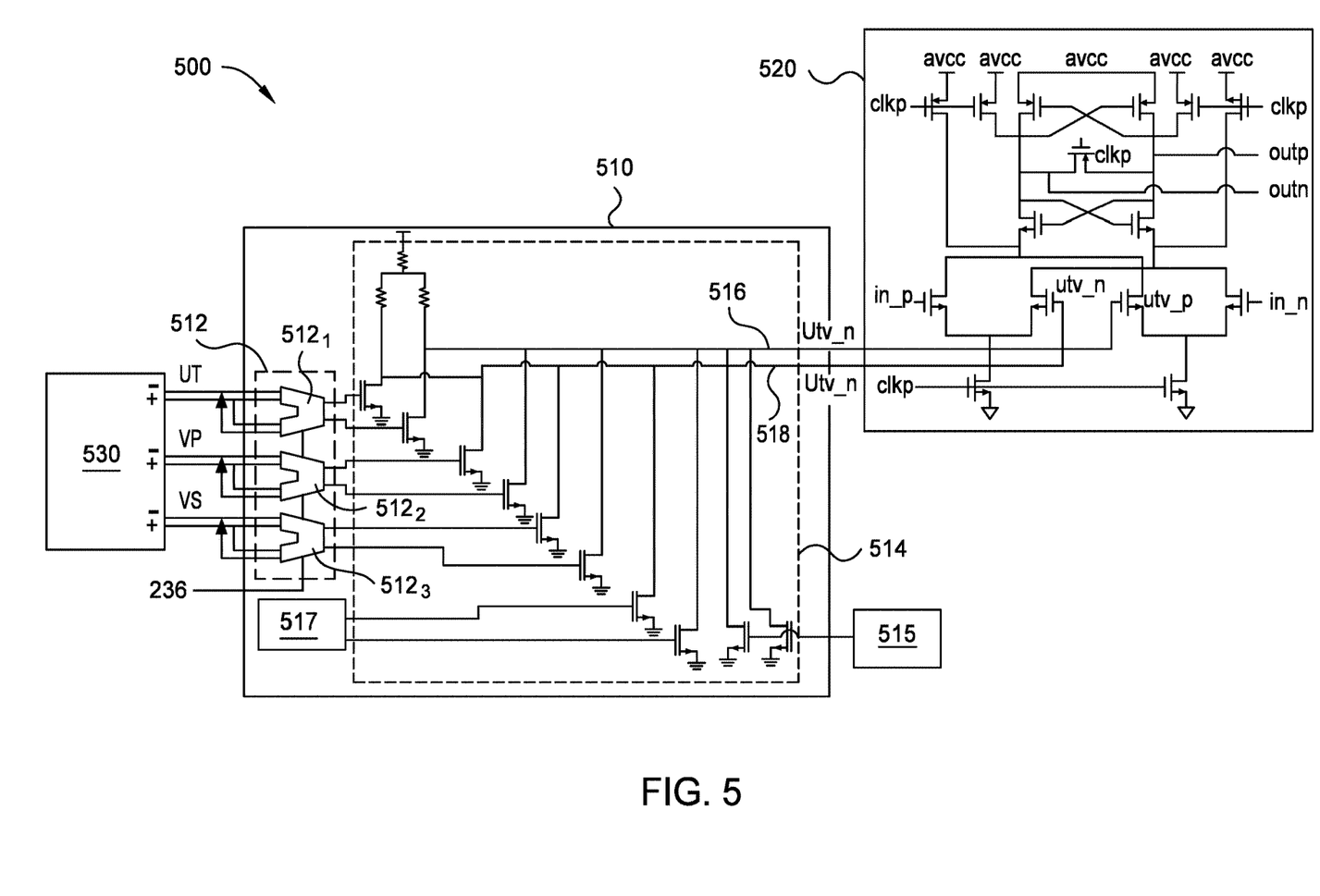
FIG. 5 is a schematic diagram of an example error slicer, according to an example.

FIG. 5 illustrates an example error slicer 500, according to one or more examples. In one embodiment, each of the error slicers $420_1$ and $420_2$ may be configured similar to that of the error slicer 500. The error slicer 500 includes reference circuitry 510, flip-flop 520, and digital-to-analog converter (DAC) circuitry 530.

The DAC circuitry 530 outputs one or more control signals to the reference circuitry 510. For example, the DAC circuitry 530 outputs control signals UT, VP, and VS. The reference circuitry 510 includes multiplexer circuitry 512 and reference generation circuitry 514. The reference generation circuitry 514 generates and outputs reference signals 516 and 518 to the flip-flop 520. The reference signal 516 and 518 are threshold voltages for the error slicer 500. The reference generation circuitry 514 generates the reference signals 516 and 518 based on the output of the multiplexer circuitry 512. The reference signals 516 and 518 are voltage signals. The polarity of the reference signal 518 is opposite that of the reference signal 516. In one example, the reference signal 518 is the negative version of the reference signal 516. The reference generation circuitry 514 includes a plurality of transistors, a common mode feedback (CMFB) circuit 515, and offset calibration DAC circuitry 517. The output of the multiplexer circuitry 512, the CMFB circuitry 515, and the offset calibration DAC circuitry 517 control the transistors to generate the reference signals 516 and 518.

The multiplexer circuitry 512 includes three or more multiplexers. The multiplexer $512_1$ receives a positive and negative version of the control signal UT, the multiplexer $512_2$ receives a positive and negative version of the control signal VP, and the multiplexer $512_3$ receives a positive and negative version of the control signal VS.

The multiplexer circuitry 512 operates in a positive domain and a negative domain based on state the clock signal 236. For example, based on the first state of the clock signal, the multiplexer circuitry 512 operates in a positive domain. Further, based on the second state of the clock signal, the multiplexer circuitry 512 operates in a negative domain. Based on the second state of the clock signal, the inputs of the multiplexer $512_1$ that receive the UT control signal are switched (e.g., reversed) as compared to the first state of the clock signal, and the polarity (sign) of reference signals 516 and 518 are switched. Accordingly, when the clock signal 236 has a first state the polarity of reference signal 516 is positive and the polarity of reference signal 518 is negative. Further, when the clock signal 236 has a second state, the polarity of the reference signal 516 is negative and the polarity of the reference signal 518 is positive. Stated another way, altering the state of the clock signal 236 alters the polarity (or sign) of the reference signals 516 and 518. The state of the clock signal 236 and the polarity of the reference signals 516 and 518 determines whether the flip-flop 520 detects a value corresponding to error voltage value EPH or EPL or error voltage value ENH or ENL. In one example, based on the clock signal 236 having the first state, the flip-flop 520 captures a value corresponding to error voltage value EPH or EPL. The flip-flop 520 captures the value corresponding to error voltage value EPH or EPL based on the voltage levels of the flip-flop 520. For example, the flip-flop 520 is a capture flip-flip where the analog voltage to digital (e.g., 0 or 1) decisions occur. The flip-flop 520 detects a targeted input voltage level based on a threshold voltage level provided by the reference circuitry 510. Further, when the clock signal 236 has a first state the error slicer 500 is a positive error slicer. Based on the clock signal 236 having the second state, the flip-flop 520 captures a value corresponding to error voltage value ENH or ENL. The flip-flop 520 captures the value correspond to error voltage value ENH or ENL based on the voltage levels of the flip-flop 520. Further, when the clock signal 236 has a second state the error slicer 500 is a negative error slicer.

By applying the time multiplexed scheme to the error slicers 420, the size of the DAC circuitry 530, the offset calibration DAC circuitry 517, and CMFB circuitry 515 may be reduced, reducing the power used by the corresponding receive circuitry and the circuit area of the corresponding receiver circuitry.

Figure 6:
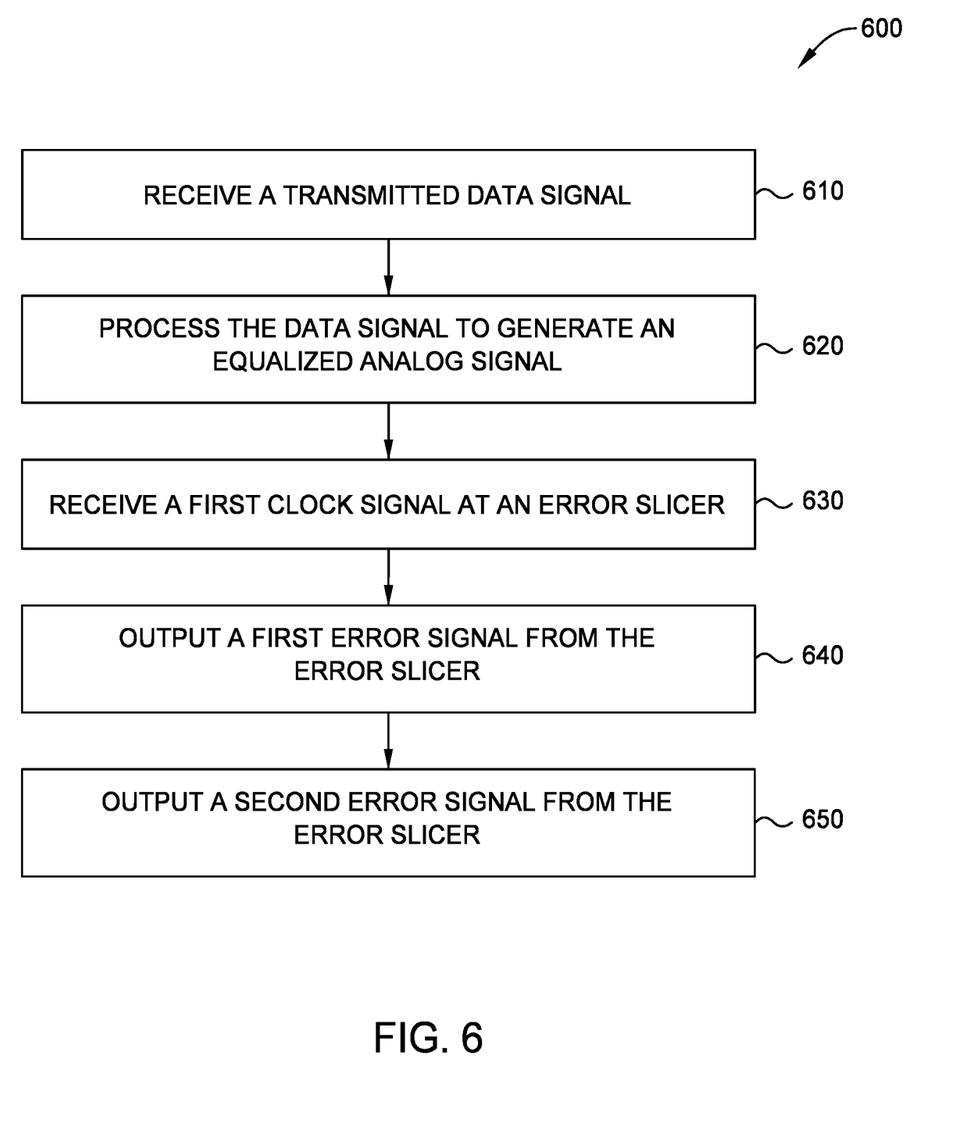
FIG. 6 is a flowchart of a method for receiving a data signal, according to an example.

FIG. 6 illustrates a flowchart of a method 600 for receiving a data signal, according to one or more examples. At operation 610 of the method 600, a transmitted data signal is received. For example, with reference to FIGS. 1 and 2, a transmitted data signal is received from the channel 130 by receiver circuitry 122 at the input pad 212. The data signal may be a data signal of a PAM4 communication system. At operation 620 of the method 600, the data signal is processed to generate an equalized analog signal. For example, with reference to FIG. 2, the data signal is processed by the signal processing circuitry 213. The level shifter circuitry 214 may alter a voltage level of the data signal based on the parameters of the CTLE circuitry 216, and the CTLE circuitry 216 generates the equalized analog signal. At operation 630 of the method 600, a clock signal is received by an error slicer of the error slicer circuitry. With reference to FIGS. 2 and 4, the CDR adaption circuitry 226 generates the clock signal 236 based on a clock signal of the CDR adaption circuitry 226 and outputs the clock signal to the error slicers 440 of the error slicer circuitry 220. In one example, every X pulse of the clock signal of the CDR adaption circuitry 226, the state of the clock signal 236 is changed. X may be 64, 128, 256, 512, 1024, or higher.

At operation 640 of the method 600, a first error signal is output by an error slicer of the error slicer circuitry. The first error signal corresponds to one or more of the error voltage value EHP 314 or error voltage value ELP 312 of FIG. 3. The first error signal is generated by sampling the equalized analog signal generated by the CTLE circuitry 216 of FIG. 2. With reference to FIGS. 2 and 4, the error slicer $420_1$ receives the equalized analog signal from the CTLE circuitry 216 (e.g., a processed data signal from the signal processing circuitry 213), detects an error voltage value EHP 314 from the equalized analog signal, and outputs the error voltage value EHP 314. The error voltage value EHP 314 is detected by the error slicer $420_1$ based on a first state of the clock signal 236. In the first state, the clock signal 236 controls the multiplexer circuitry $422_1$ to generate reference voltages that control the error slicer $420_1$ to detect the error voltage value EHP 314. The error slicer $420_1$ may be referred to as a positive voltage error slicer when the clock signal 236 has the first state. The operation 640 may correspond to a first period.

At 650 of the method 600, a second error signal is output by the error slicer of the error slicer circuitry. The second error signal is the error voltage value EHN 310 of FIG. 3. With reference to FIGS. 2 and 4, the error slicer $420_1$ receives the equalized analog signal from the CTLE circuitry 216, detects the error voltage value EHN 310 from the equalized analog signal, and outputs the error voltage value EHN 310. The error voltage value EHN 310 is detected by the error slicer $420_1$ based on a second state of the clock signal 236. In the second state, the clock signal 236 controls the multiplexer circuitry $422_1$ to generate reference voltages that control the error slicer $420_1$ to detect the error voltage value ELP 312. The error slicer $420_1$ may be referred to as a negative voltage error slicer when the clock signal 236 has the second state. The operation 650 corresponds to a second period that is non-overlapping with the first period.

In one example, during operations 640 and 650 of the method 600, the multiplexer circuitry 512 within the error slicer 500 receives the clock signal 236. The state of the clock signal 236 controls the state of the multiplexer circuitry 512 to control the polarity, or sign or state, of the reference signals generated by the reference circuitry 510. For example, based on the state of the clock signal 236 changing, the polarity of the reference signals generated by the reference circuitry 510 changes. During each state of the clock signal 236, the data slicer circuitry 218 detects the threshold references DH, DZ, and DL for each respective phase of the clock signal 234.

In the above, receiver circuitry that includes both error slicer circuitry and data slicer circuitry is described. The error slicer circuitry detects voltage levels associated with different voltage references and the error slicers of the error slicer circuitry are controlled in a time-multiplexed fashion. Time multiplexing the error slicers reduces the size of the circuit area of the receiver circuitry and the power used by the receiver circuitry. In one example, each error slicer within the error slicer circuitry detects two different voltage references. Each error slicer with the error slicer circuitry may detect a positive voltage reference during a first period and a negative voltage reference during a second period.

While the foregoing is directed to specific examples, other and further examples may be devised without departing from the basic scope thereof, and the scope thereof is determined by the claims that follow.

What is claimed is:

1. Receiver circuitry for a communication system, the receiver circuitry comprising:
    signal processing circuitry configured to receive a data signal and generate a processed data signal; and
    error slicer circuitry coupled to an output of the signal processing circuitry, configured to receive the processed data signal, and comprising:
        a first error slicer comprising multiplexer circuitry configured to receive a clock signal, the multiplexer circuitry configured to be set to a first multiplexer state based on a first clock state of the clock signal and a second multiplexer state based on a second clock state of the clock signal, wherein the first error slicer is configured to:
            output a first error signal based on the first multiplexer state and the processed data signal; and
            output a second error signal based on the second multiplexer state and the processed data signal.

2. The receiver circuitry of claim 1, wherein the first error signal has a positive voltage and the second error signal has a negative voltage, and wherein a magnitude of the first error signal and a magnitude of the second error signal are similar.

3. The receiver circuitry of claim 1, wherein the error slicer circuitry further comprises:
    a second error slicer configured to:
        receive the clock signal;
        output a third error signal based on the first state of the clock signal and the processed data signal; and
        output a fourth error signal based on the second state of the clock signal and the processed data signal.

4. The receiver circuitry of claim 3, wherein the third error signal has a positive voltage and the fourth error signal has a negative voltage, and wherein a magnitude of the third error signal and a magnitude of the fourth error signal are similar.

5. The receiver circuitry of claim 1, wherein the first error slicer further comprises:
    reference circuitry comprising the first multiplexer circuitry, wherein the multiplexer circuitry is further configured to generate a first reference signal and a second reference signal based on the clock signal; and
    a flip-flop configured to capture one of a first error voltage value or a second error voltage value based on a polarity of the first reference signal and a polarity of the second reference signal.

6. The receiver circuitry of claim 5, wherein, based on the clock signal having the first clock state, the multiplexer circuitry generates the first reference signal having a positive polarity and the second reference signal having a negative polarity, and based on the clock signal having the second clock state, the multiplexer circuitry generates the first reference signal having a negative polarity and the multiplexer circuitry generates the second reference signal having a positive polarity.

7. The receiver circuitry of claim 6, wherein the flip-flop is configured to:
    capture the first error voltage value based on the polarity of the first reference signal being positive and the polarity of the second reference signal being negative; and
    capture the second error voltage value based on the polarity of the first reference signal being negative and the polarity of the second reference signal being positive, wherein the first error voltage value has a positive polarity and the second error voltage value has a negative polarity.

8. A communication system comprising:
    transmitter circuitry configured to transmit a data signal; and
    receiver circuitry connected to the transmitter circuitry via a channel, the receiver circuitry comprising:
        signal processing circuitry configured to receive the data signal and generate a processed data signal; and
        error slicer circuitry coupled to an output of the signal processing circuitry and comprising:
            a first error slicer comprising multiplexer circuitry configured to receive a clock signal, the multiplexer circuitry configured to be set to a first multiplexer state based on a first clock state of the clock signal and a second multiplexer state based on a second clock state of the clock signal, wherein the first error slicer is configured to:
                output a first error signal based on the first multiplexer state of the clock signal and the processed data signal; and
                output a second error signal based on the second multiplexer state of the clock signal and the processed data signal.

9. The communication system of claim 8, wherein the first error signal has a positive voltage and the second error signal has a negative voltage, and wherein a magnitude of the first error signal and a magnitude of the second error signal are similar.

10. The communication system of claim 8, wherein the error slicer circuitry further comprises:
    a second error slicer configured to:
        receive the clock signal;
        output a third error signal based on the first state of the clock signal and the processed data signal; and
        output a fourth error signal based on the second state of the clock signal and the processed data signal.

11. The communication system of claim 10, wherein the second error slicer generates the third error signal having a voltage level that is less than a voltage level of the first error signal generated by the first error slicer.

12. The communication system of claim 8, wherein the first error slicer further comprises:
    reference circuitry comprising the multiplexer circuitry, the multiplexer circuitry is further configured to generate a first reference signal and a second reference signal based on the clock signal; and
    a flip-flop configured to capture a first error voltage value or a second error voltage value based on a polarity of the first reference signal and a polarity of the second reference signal.

13. The communication system of claim 12, wherein, based on the clock signal having the first clock state, the multiplexer circuitry generates the first reference signal having a positive polarity and the second reference signal having a negative polarity, and based on the clock signal having the second clock state, the multiplexer circuitry generates the first reference signal having a negative polarity and the multiplexer circuitry generates the second reference signal having a positive polarity.

14. The communication system of claim 13, wherein the flip-flop is configured to:
- capture the first error voltage value based on the polarity of the first reference signal being positive and the polarity of the second reference signal being negative; and
- capture the second error voltage value based on the polarity of the first reference signal being negative and the polarity of the second reference signal being positive, wherein the first error voltage value has a positive polarity and the second error voltage value has a negative polarity.

15. A method for operating receiver circuitry, the method comprising:
- receiving a data signal;
- processing the data signal to generate a processed data signal;
- receiving, at a multiplexer of a first error slicer of error slicer circuitry, a clock signal;
- setting the multiplexer to a first multiplexer state based on a first clock state of the clock signal and a second multiplexer state based on a second clock state of the clock signal;
- outputting, from the first error slicer, a first error signal based on the first multiplexer state and the processed data signal; and
- outputting, from the first error slicer, a second error signal based on the second multiplexer state and the processed data signal.

16. The method of claim 15 further comprising:
- outputting, from a second error slicer of the error slicer circuitry, a third error signal based on the first state of the clock signal and the processed data signal; and
- outputting, from the second error slicer, a fourth error signal based on the second state of the clock signal and the processed data signal.

17. The method of claim 16, wherein a voltage level of the third error signal is less than a voltage level of the first error signal.

18. The method of claim 16 further comprising:
- generating the first error signal during a first period and the third error signal during a second period, wherein the first period at least partially overlaps with the second period.

19. The method of claim 15, wherein reference circuitry of the first error slicer comprises multiplexer circuitry and is configured to generate a first reference signal and a second reference signal based on the clock signal, and wherein one of a first error voltage value and a second error voltage value is captured by a flip-flop of the first error slicer based on a polarity of the first reference signal and a polarity of the second reference signal.

20. The method of claim 19, wherein, based on the clock signal having the first clock state, a polarity of the first reference signal is positive and a polarity of the second reference signal is negative, and based on the clock signal having the second clock state, the polarity of the first reference signal is negative and the polarity of the second reference signal is positive.

* * * * *